United States Patent
Ein-Eli et al.

(10) Patent No.: US 8,835,060 B2
(45) Date of Patent: *Sep. 16, 2014

(54) SILICON-AIR BATTERIES

(75) Inventors: Yair Ein-Eli, Haifa (IL); Digby Donald MacDonald, State College, PA (US)

(73) Assignees: Technion Research & Development Foundation Limited, Haifa (IL); The Penn State Research Foundation, University Park, PA (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/254,171

(22) PCT Filed: Feb. 11, 2010

(86) PCT No.: PCT/IL2010/000127
§ 371 (c)(1),
(2), (4) Date: Sep. 1, 2011

(87) PCT Pub. No.: WO2010/100636
PCT Pub. Date: Sep. 10, 2010

(65) Prior Publication Data
US 2011/0318657 A1    Dec. 29, 2011

Related U.S. Application Data

(60) Provisional application No. 61/156,959, filed on Mar. 3, 2009, provisional application No. 61/181,011, filed on May 26, 2009.

(51) Int. Cl.
| | |
|---|---|
| *H01M 8/22* | (2006.01) |
| *H01M 4/36* | (2006.01) |
| *H01M 8/10* | (2006.01) |
| *H01M 4/38* | (2006.01) |
| *H01M 4/02* | (2006.01) |
| *H01M 12/06* | (2006.01) |

(52) U.S. Cl.
CPC ...... *H01M 12/06* (2013.01); *H01M 2300/0014* (2013.01); *Y02E 60/128* (2013.01); *H01M 4/38* (2013.01)
USPC ............ 429/405; 429/484; 429/485; 429/523

(58) Field of Classification Search
None
See application file for complete search history.

(56) References Cited

U.S. PATENT DOCUMENTS

| | | | | |
|---|---|---|---|---|
| 3,513,031 | A * | 5/1970 | Zaromb | 429/405 |
| 4,913,983 | A * | 4/1990 | Cheiky | 429/407 |
| 2004/0126659 | A1* | 7/2004 | Graetz et al. | 429/218.1 |
| 2004/0241537 | A1* | 12/2004 | Okuyama et al. | 429/86 |
| 2009/0239113 | A1 | 9/2009 | Hase et al. | |
| 2012/0299550 | A1 | 11/2012 | Ein-Eli et al. | |

FOREIGN PATENT DOCUMENTS

| | | |
|---|---|---|
| WO | WO 00/44057 | 7/2000 |
| WO | WO 2010/100636 | 9/2010 |

OTHER PUBLICATIONS

Pickett, Optimization of Silicon-Air Fuel Cells (2005), as provided art in an IDS.*
International Preliminary Report on Patentability Dated May 31, 2012 From the International Bureau of WIPO Re. Application No. PCT/IL2010/000125.

(Continued)

*Primary Examiner* — Yoshitoshi Takeuchi

(57) ABSTRACT

Silicon-oxygen batteries comprising a silicon anode as chemical fuel, an air-cathode for dissociating oxygen, and an electrolyte, and applications using the same are provided. The silicon-batteries may utilize air for generating oxygen.

21 Claims, 3 Drawing Sheets
(1 of 3 Drawing Sheet(s) Filed in Color)

(56) References Cited

OTHER PUBLICATIONS

International Preliminary Report on Patentability Dated Sep. 15, 2011 From the International Bureau of WIPO Re. Application No. PCT/IL2010/000127.

International Search Report and the Written Opinion Dated Jul. 5, 2010 From the International Searching Authority Re.: Application No. PCT/IL2010/000127.

International Search Report and the Written Opinion Dated May 18, 2010 From the International Searching Authority Re.: Application No. PCT/IL2010/000125.

Abelev et al. "Enhanced Copper Surface Protection in Aqueous Solutions Containing Short-Chain Alkanoic Acid Potassium Salts", Langmuir, 23: 11281-11288, 2007.

Abelev et al. "Potassium Sorbate—a New Aqeous Copper Corrosion Inhibitor Electrochemical and Spectroscopic Studies", Electrochimica Acta, 52: 1975-1982, 2007.

Abelev et al. "Potassium Sorbate Solutions as Copper Chemical Mechanical Planarization (CMP) Based Slurries", Electrochimica Acta, 52: 5150-5158, 2007.

Cohen et al. "Silicon—Air Batteries", Electrochemistry Communications, XP026685102, 11(10): 1916-1918, Oct. 2009.

Ein-Eli et al. "Food Preservatives Serving as Nonselective Metal and Alloy Corrosion Inhibitors", Electrochemical and Solid-State Letters, 9: B5-B7, 2006.

Ein-Eli et al. "Review on Copper Chemical—Mechanical Polishing (CMP) and Post-CMP Cleaning in Ultra Large System Integrated (ULSI)—An Electrochemical Perspective", Electrochimica Acta 52:1825-1838, 2007.

Pickett "Optimization of A Silicon-Air Fuel Cell", Writing Samples, XP002580544, Retrieved From the Internet, Jan. 29, 2005. & Index of Pickett/Resume, XP002585963, Jan. 29, 2005. & "Resume", XP002585964, Jan. 29, 2005.

Restriction Official Action Dated Jul. 21, 2014 From the US Patent and Trademark Office Re. U.S. Appl. No. 13/510,940.

\* cited by examiner

SILICON-AIR BATTERIES

RELATED APPLICATIONS

This application is a National Phase of PCT Patent Application No. PCT/IL2010/000127 having International filing date of Feb. 11, 2010, which claims the benefit of priority of U.S. Provisional Patent Application Nos. 61/181,011 filed on May 26, 2009, and 61/156,959 filed on Mar. 3, 2009. The contents of the above applications are all incorporated herein by reference.

FIELD AND BACKGROUND OF THE INVENTION

The present invention, in some embodiments thereof, relates to energy conversion, and more particularly, but not exclusively, to electrochemical cell systems which utilize air and which can be utilized for forming batteries and fuel cells, and to applications of such batteries and fuel cells.

The continuous search for clean, sustainable and cost-effective source of energy has pushed materials and electrochemical sciences to development of new materials and technologies for portable power sources. The prime objectives include reducing the size of the power source and at the same time increasing its energy or power density, along-side of reducing cost and toxic hazards while increasing safety and ease of use thereof.

Electrochemical cell devices, referred to in the art as "batteries", are composed of one or more electrochemical or voltaic cells, which store chemical energy and provide it as available electricity due to a potential difference between its electrodes. Types of electrochemical cells include galvanic cells, electrolytic cells, fuel cells, flow cells, and voltaic cells, each comprising two half-cells: one for the oxidation reaction of the chemical fuel (negative electrode or anode) and one for the reduction reaction of the oxidant (positive electrode or cathode). Batteries generate electricity without combustion of the fuel and oxidizer. As opposed to what occurs with other methods of electricity generation, the chemical energy is converted into electrical current and some heat, driven by the redox potential difference between the two halves of the cells. Batteries are therefore typically characterized by having a positively charged anode, a negatively charged cathode, an ion-conducting material referred to as an electrolyte, and conducting negative and positive terminals which conduct the resulting electric current in and out of an electric circuit.

A fuel cell (FC) is a particular type of electrochemical cell device (battery) that continuously converts chemical energy directly to electrical energy as long as a fuel (commonly hydrogen, hydrogen-generating compounds or metallic anode material) and an oxidant (commonly oxygen) are supplied. Fuel cells are characterized by high efficiency compared to internal combustion engines. In addition, fuel cells are ecologically friendly and can function under a wide range of physical conditions.

The development of fuel cells is one of the main directions in the field of new power engineering. Several types of fuel cells based on $H_2/O_2$, $NaBH_4/H_2O_2$, phosphoric acid, molten carbonate, direct methanol and solid oxide were developed in the last two decades. However, these fuel cells are still far from mass production due to multiple practical limitations.

Metal-air batteries have been attracting the electrochemistry research and development community for the last fifty years. Their attractiveness lies in the principle that the cathodic reaction is a catalyzed reduction of oxygen consumed from ambient air rather than oxygen stored in the system. The air battery using the oxygen in air as a positive electrode active material does not require any space for incorporating the active material, and is hence expected to have a high capacity. This aspect results in high energy densities (measured in watt-hour, or Whr) and high specific energies (measured in watt-hour per kilogram, or Whr/kg) for the metal-air batteries.

The general structure of a metal-air battery, such as a lithium-air secondary battery, includes a catalyst layer, an air positive electrode (cathode), a negative electrode (anode), a polymer electrolyte film interposed between the anode and cathode, and an oxygen permeation film laminated on the air cathode. The air cathode may contain, for example, a polymer electrolyte film comprising polyacrylonitrile, ethylene carbonate, propylene carbonate, and $LiPF_6$, which is press-bonded to a nickel or aluminum mesh. Alternatively, the cathode is formed of a lithium foil, and this four-layer laminated body is sealed in a laminate bag. The catalyst layer for ionizing the oxygen in the ambient air can be made, for example, of acetylene black (a form of carbon black which is a fine black powder of amorphous carbon obtained by the incomplete combustion of hydrocarbons) containing cobalt.

Most metal-air batteries, including Zn-air, Al-air and Fe-air, utilize aqueous alkaline solutions, mainly potassium hydroxide (KOH), due to the high conductivity of such electrolyte and the superb ability to regulate the reduced oxygen ion into hydroxide anions. Zn-air batteries has received broad attention in the 1960's and 1970's, with the development of commercialized primary cells, in coin type structure, for hearing aids operation, although in the last ten years there has been an enormous effort to construct large scale Zn-air batteries for electric vehicles.

The Al-air couple has higher theoretical densities compared to its competitors (Zn-air and Fe-air) and was under investigation as a suitable power source for vehicles and some stationary applications. However, high open circuit corrosion rates lead to the consumption of the Al metal anode without any usable power output.

The lithium-air battery presents the highest theoretical specific energy value (11,246 Whr/kg). Although theoretically high energy density is expected from a lithium-air cell system, nontrivial challenges associated with a practical lithium-air cell exist. For example, Li suffers from severe corrosion in alkaline electrolytes and safety concerns are still unresolved with aqueous systems. In addition, lithium-air cells are sensitive to anode passivation due to air/moisture contamination, the operating current density is typically very low (less than 100 $\mu A/cm^2$). In 1996, researchers reported a conducting polymer electrolyte-based secondary lithium-air battery. This battery showed open circuit potential (OCP) of about 3 V and working voltage in the range of 2 to 2.8 V. However, good coulombic efficiency was kept for only a few cycles.

Overall, the majority of these fuel cell technologies suffer from a range of drawbacks, such as size-, weight- and capacity limitations, hazardous and/or toxic components and by-products, and cost effectiveness over the entire life-cycle of the device including environmentally safe disposal. Other obstacles associated with fuel cell development include complex electrode and cell design, catalysts poisoning and mechanical instability, high catalyst cost, low potential and slow oxidation kinetic.

It is known in the art that silica undergoes rapid corrosion when in contact with aqueous alkaline solutions such as a KOH solution [Seidel, H. et a, *J. Electrochem. Soc.*, 137 (1990) 3626, and Glembocki, O. J. et al., *J. Electrochem. Soc.*, 138 (1991) 1055], a trait which has served the semiconductor industry for years for silicon etching. Additional background art includes U.S. Pat. No. 4,943,496 and U.S. Patent Application Nos. 20060255464, 20080096061, 20090208791 and 20090208792.

SUMMARY OF THE INVENTION

The present inventor successfully practiced an electrochemical cell based on a silicon-oxygen redox couple, which harnesses the energy potential in the process of turning silicon to silicon dioxide to generate electricity.

Hence, according to an aspect of some embodiments of the present invention, there is provided a battery which includes an anode, a cathode, an electrolyte and an electric conduit to allow electric current flow between the cathode and the anode, wherein the anode includes silicon as fuel, and the cathode includes oxygen as an oxidant.

In some embodiments, the oxygen is derived from ambient air.

In some embodiments, the anode includes amorphous silicon.

In some embodiments, the anode includes silicon is in a form of a single crystal wafer.

In some embodiments, the orientation of the crystal is selected from the group consisting of silicon [100] crystal orientation, silicon [111] crystal orientation and silicon [101] crystal orientation.

In some embodiments, the silicon includes a dopant.

In some embodiments, the dopant is selected from the group consisting of antimony, phosphorus, arsenic, boron, aluminium and gallium.

In some embodiments, the dopant is selected from the group consisting of a p-type dopant and an n-type dopant.

In some embodiments, the silicon is doped degenerately.

In some embodiments, the silicon is in a form of an alloy which includes at least one metal in an amount that ranges from 1 to 99 percents by weight of the anode.

In some embodiments, the silicon is in a form of a powder.

In some embodiments, the silicon powder further includes a powder of at least one metal in an amount that ranges from 1 to 99 percents by weight of the anode.

In some embodiments, the powder is a powder of an alloy which includes silicon and at least one metal in an amount that ranges from 1 to 99 percents by weight of the anode.

In some embodiments, the metal is selected from the group consisting of iron, lithium, sodium, magnesium, copper, nickel, zinc, aluminum, germanium, gallium, silver and manganese.

In some embodiments, the electrolyte is an aqueous alkaline solution.

In some embodiments, the aqueous alkaline solution further includes silicic acid at a concentration ranging from 0.001 to 70 percent by weight of the solution.

In some embodiments, the aqueous alkaline solution further includes fluoride. In some embodiments, the fluoride is present in the electrolyte at a concentration ranging from 0.001 to 50 percents by weight of the solution.

In some embodiments, the fluoride is selected from the group consisting of HF, NH4F and KF.

In some embodiments, at least one of the anode and the cathode includes a catalyst layer.

In some embodiments, the cathode includes a catalyst layer, and, in some embodiments, the catalyst is selected from the group consisting of palladium, platinum, nickel, cobalt, iron, manganese, an oxide thereof, a carbonaceous material, and any combination thereof.

In some embodiments, the cathode is an air cathode.

In some embodiments, the air cathode is configured as a plate, a fibrous, a mesh, a rod, a tubular body, a sintered type cathode (having a sintered type body), or a foamed type cathode (having a foamed type body).

In some embodiments, the air cathode includes a catalyst which is capable of accelerating dissociation of molecular oxygen.

In some embodiments, the air cathode further includes a carbonaceous material.

In some embodiments, the battery further includes a device capable of increasing the flow of oxygen therein.

In some embodiments, the oxygen flow device is selected from the group consisting of a pump, a fan, a ventilator a high-pressure container and a tube.

According to another aspect of some embodiments of the present invention, there is provided an electricity-consuming device, powered by the battery presented herein.

According to another aspect of some embodiments of the present invention, there is provided a method of powering an electricity-consuming device, which is effected by powering the electricity-consuming device with the battery presented herein.

In some embodiments, the electricity-consuming device is selected from the group consisting of microelectromechanical systems (MEMS), an autonomous sensor, an autonomous medical device, an illumination device, an autonomous electromechanical device, an electric vehicle, an uninterrupted power supply device and an electricity storage device.

According to another aspect of some embodiments of the present invention, there is provided a portable power source, which includes the battery presented herein.

As used herein the term "about" refers to ±10%.

The terms "comprises", "comprising", "includes", "including", "having" and their conjugates mean "including but not limited to". The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Some embodiments of the invention are herein described, by way of example only, with reference to the accompanying drawings and images. With specific reference now to the drawings and images in detail, it is stressed that the particulars shown are by way of example and for purposes of illustrative discussion of embodiments of the invention. In this regard, the description taken with the drawings and images makes apparent to those skilled in the art how embodiments of the invention may be practiced.

In the drawings.

DESCRIPTION OF EMBODIMENTS OF THE INVENTION

Figure 1:
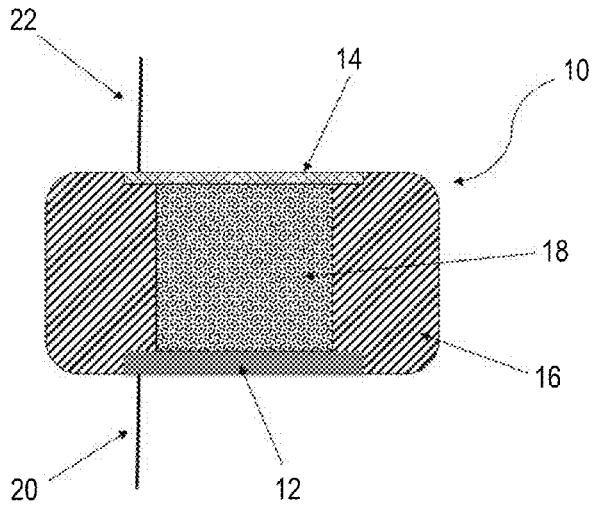
FIG. 1 presents a schematic illustration of a prototype of silicon-air battery 10, according to some embodiments of the present invention, wherein Si anode 12 is a silicon wafer, air cathode 14 is a nickel mesh, attached on opposite openings of polypropylene flask 16 containing electrolyte 18 and fitted with negative terminal 20 and positive terminal 22.

The present invention, in some embodiments thereof, relates to energy conversion, and more particularly, but not exclusively, to electrochemical cell system which utilizes air and which can be utilized for forming batteries and fuel cells, and to applications of such batteries and fuel cells.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

According to an aspect of some embodiments of the present invention, there is provided a battery which comprises an anode, a cathode, an electrolyte and an electric conduit to allow electric current flow between said cathode and said anode, said anode comprising silicon as fuel, and said cathode comprising oxygen as an oxidant.

The battery described herein utilizes silicon as an electrochemical fuel, air as a source of oxidant, and an aqueous electrolyte. Without being bound by any particular theory, it is assumed that a silicon/oxygen couple undergoes a redox electrochemical reaction to give silicon dioxide, according to the following postulated scheme:

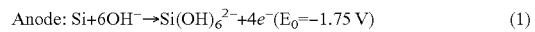

Anode: $Si + 6OH^- \rightarrow Si(OH)_6^{2-} + 4e^-$ ($E_0 = -1.75$ V)  (1)

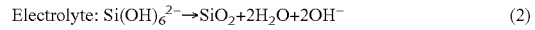

Electrolyte: $Si(OH)_6^{2-} \rightarrow SiO_2 + 2H_2O + 2OH^-$  (2)

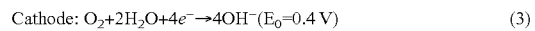

Cathode: $O_2 + 2H_2O + 4e^- \rightarrow 4OH^-$ ($E_0 = 0.4$ V)  (3)

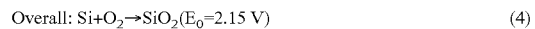

Overall: $Si + O_2 \rightarrow SiO_2$ ($E_0 = 2.15$ V)  (4)

As discussed hereinabove, metal-air batteries have been investigated. Currently, the most widely used electrolyte in such batteries is an alkaline electrolyte such as KOH. While it is well known that silicon corrodes rapidly in the presence of aqueous alkaline electrolyte [Seidel, H. et a, *J. Electrochem. Soc.*, 137 (1990) 3626, and Glembocki, O. J. et al., *J. Electrochem. Soc.*, 138 (1991) 1055] the constructions and operation of a silicon-air battery as described herein is non-trivial.

As demonstrated in the Examples section that follows, the present inventor has surprisingly demonstrated that silicon-air batteries are indeed feasible, and their discharge period can be extended remarkably when measures to reduce corrosion, as well as other measures are taken.

In the context of the present embodiments, the term "battery" refers to an electrochemical cell device in the general sense, consisting of one or more electrochemical or voltaic cells, which store chemical energy and provide it as available electricity due to a potential difference between its electrodes. Types of electrochemical cells include galvanic cells, electrolytic cells, fuel cells, flow cells, and voltaic cells, each comprising two half-cells: one for the oxidation reaction of the chemical fuel (negative electrode or anode) and one for the reduction reaction of the oxidant (positive electrode or cathode). Batteries generate electricity without combustion of the fuel and oxidizer. As opposed to what occurs with other methods of electricity generation, the chemical energy is converted into electrical current and some heat, driven by the redox potential difference between the two halves of the cells. Batteries are therefore characterized by having a positively charged anode, a negatively charged cathode, an ion-conducting material referred to as an electrolyte, and conducting negative and positive terminals which conduct the resulting electric current in and out of an electric circuit.

The term "fuel cell", as used herein, refers to one type of an electrochemical cell device, or battery, which continuously converts chemical energy directly to electrical energy as long as a fuel and an oxidant are supplied. Electricity is generated through the reaction, triggered in the presence of an electrolyte, between the fuel (on the anode side) and an oxidant (on the cathode side), which flow into the cell, while the electrolyte remains in the cell. Fuel cells can operate virtually continuously as long as the necessary aforementioned flows are maintained.

Fuel cells are different from conventional electrochemical cell batteries, in that they consume reactant from an external source, which must be replenished, therefore constitute a thermodynamically open system, while conventional cells store electrical energy chemically and hence represent a thermodynamically closed system.

According to some embodiments of the invention, the battery described herein uses silicon as fuel is a silicon-air battery, such that oxygen from ambient air is consumed as the oxidant at the cathode.

Referring now to the drawings, FIG. 1 presents a schematic illustration of a prototype of a silicon-air battery according to some embodiments of the invention. Silicon-air battery 10 comprises silicon anode 12 (realized by a silicon wafer for example), air cathode 14 (realized by a carbon-black coated nickel mesh for example), attached on opposite openings of polypropylene flask 16 containing electrolyte 18 and fitted with negative terminal 20 and positive terminal 22.

According to some embodiments, the anode comprises amorphous silicon, as this substance is known in the art.

According to some embodiments of the invention, the anode comprises silicon in macroscopic crystalline form, otherwise known as a single crystal wafer from, as this term is used in the field of material science, electrochemistry and electronic industry.

As known in the art, single crystal wafers are characterized by a crystal orientation. The phrase "crystal orientation", as used herein, refers to a physico-mechanical property of silicon wafers which are grown from a single crystal and having a regular crystal structure. Since silicon has a diamond cubic structure, when cut into wafers, the surface is aligned in one of several relative directions known as crystal orientations, which are defined by the Miller index with [100], [111] or [101] faces being the most common for silicon. Crystal orientation is a significant property since many of a single crystal's structural and electronic properties are highly anisotropic. For example, ion implantation depths (doping) which effects conductivity, depend on the wafer's crystal orientation, since each direction offers distinct paths for transport.

Since the operation of a silicon-air battery is correlated also to the conductivity of the silicon anode, the crystal orientation of the silicon plays a role in this correlation, thus, according to some embodiments of the present invention, the orientation of the silicon crystal can be, for example, the [100] crystal orientation, the [111] crystal orientation and the [101] crystal orientation.

According to the terms used in the field, an electric current in silicon is generated by the movement of electrons (negative charges) or "holes" (positive charges) through the silicon crystal lattice, going from one lattice defect to the next. According to some embodiments of the invention, the silicon crystal can be pristine (minimal occurrences of lattice defects) or doped (being intentionally endowed with crystal defects), as these terms are known in the art. As used herein, the term "p-doping" refers to doping of a semiconductor with a substance ("dopant") which is capable of accepting weakly-bound outer electrons from the semiconductor material. Thus p-doping, wherein "p" denotes positive, is a process of doping a semiconductor with an acceptor material, or p-type dopant, which forms "holes", or positive charges, in the semiconductor. As used herein, the term "n-doping" refers to doping of a semiconductor with a substance ("dopant") which is capable of donating weakly-bound outer electrons to the semiconductor material. Thus n-doping, wherein "n" denotes negative, is a process of doping a semiconductor with a donor material, or n-type dopant, which donates electrons to the semiconductor.

It is to be noted that in some occurrences in the literature, the term "doped" or "doping" in the context of silicon crystals and other semiconductors, denote mixing of small amounts of one substance into a bulk of another substance without effecting a specific augmentation of electrical conductivity but rather effect color, morphology, ion transfer and other physicochemical phenomena. However, the term "doping", as used herein and is known in the art, exclusively refers to the protocol of electrical doping where the doping results in the enhancement of charge carrier density in the doped semiconductor material, such as silicon, which augments its capacity to carry an electrical current, as opposed to general "mixing" or "coating" where no electrical doping occurs.

The presence of electrons or holes, which are termed n-type or p-type semiconductor material, respectively, is the basis for any conductivity of silicon. Thus, doping of silicon (the addition of dopants to silicon crystals) may render the latter so as to conduct electricity nearly as well as some metals. Depending on the kind of dopant, doped silicon is altered in the number of electrons or holes. The term "n" is used for n-type dopant, and the term "p" is used for p-type dopant.

According to some embodiments of the present invention, the silicon crystal wafer used as the anode in the silicon-air batteries presented herein, comprises a dopant, which can be a p-type dopant and an n-type dopant.

The level of doping depends upon the type of semiconductor and its intended use. Lightly- and moderately-doped semiconductors are referred to as extrinsic, while a semiconductor doped to such high levels that render it more like a conductor than a semiconductor, is referred to as "degenerate". When a comparatively small number of dopant atoms are added, on the order of one per 100 million atoms, the doping is said to be low or light. When many more dopant atoms are added, on the order of one per ten thousand atoms, the doping is referred to as heavy or high. This is often shown as n+ and n++ for n-type doping or p+ and p++ for p-type doping.

In general, an increase in doping concentration affords an increase in conductivity due to the higher concentration of carriers available for conduction. Degenerately (very highly) doped semiconductors have conductivity levels comparable to metals and are often used in modern integrated circuits as a replacement for metal. It is noted herein that even degenerate levels of doping imply low concentrations of impurities with respect to the base semiconductor. In crystalline intrinsic (un-doped) silicon, there are approximately $5 \times 10^{22}$ atoms/$cm^3$, and doping concentration for silicon semiconductors may range anywhere from $10^{13}$ atoms/$cm^{-3}$ to $10^{18}$ atoms/$cm^{-3}$. Doping concentration above about $10^{18}$ atoms/$cm^{-3}$ is considered degenerate (heavy doping) at room temperature. Degenerately doped silicon contains a proportion of impurity to silicon in the order of parts per thousand. This proportion may be reduced to parts per billion in very lightly doped silicon. Doping concentration values fall within this range and are selected to produce the desired properties in the device that the semiconductor is intended for.

According to some embodiments of the present invention, the anode silicon wafer is heavily-doped, or in the terms of the art, it is doped degenerately so as to conduct almost like some metal. Non-limiting examples for dopants which can be used in the context of the present embodiments include antimony, phosphorus and arsenic as donors (n-type) dopants of silicon, and boron, aluminum and gallium as acceptors (p-type) dopants.

In order to augment the electric properties of the silicon anode, one or more metals can be incorporated therein. According to some embodiments of the invention, the anode can be made of a metal alloy of silicon, having from 1 to 99 percent by weight of at least one metal. The metal(s) can be any metal, including alkali metals such as lithium, sodium, potassium, rubidium, caesium and francium, alkaline earth metals such as beryllium, magnesium, calcium, strontium, barium, radium, transition metals such as zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, tantalum, tungsten, rhenium, osmium, iridium, platinum, gold, mercury, rutherfordium, dubnium, seaborgium, bohrium, hassium, meitnerium, darmstadtium, roentgenium and ununbium, post-transition metals such as aluminium, gallium, indium, tin, thallium, lead, bismuth, ununtrium, ununquadium, ununpentium and ununhexium, lanthanoids such as lanthanum, cerium, praseodymium, neodymium, promethium, samarium, europium, gadolinium, terbium, dysprosium, holmium, erbium, thulium, ytterbium and lutetium, and actinoids such as actinium, thorium, protactinium, uranium, neptunium, plutonium, americium, curium, berkelium, californium, einsteinium, fermium, mendelevium, nobelium and lawrencium. Alternatively, the silicon anode may also include lithium, sodium, magnesium, copper, nickel, zinc, aluminum, germanium, gallium, silver and manganese.

In order to facilitate the replenishment of the silicon fuel and improve its performance, the silicon can be in the form of a powder, thus the system can benefit from the intrinsic imperfections of small fragments of the silicon lattice and moreover, benefit from the increased surface area of a powder as compared to the monolithic anode of a single silicon wafer of comparable mass. In such embodiments, an anodic silicon powder is used, as opposed to the monolithic anode configuration presented hereinabove.

The anodic silicon powder, according to some embodiments of the invention, may be characterized by a particle size ranging from 0.1 micrometer to 1 millimeter, although finer or cruder powders are also contemplated.

According to some embodiments of the present invention, the anodic powder may be in a powder formed from an alloy of silicon and other metals (a powder of the alloy), as presented in the case of the monolithic alloy anode, or can be a mixture of silicon powder and powders of one or more other metals.

The silicon-air battery presented herein further comprises an electrolyte. The term "electrolyte", as used herein, refers to a substance containing free ions which can conduct electricity by charge displacement of charge carrier species. Electrolytes which consist of ions in solution are typically known as ionic solutions, and are typically aqueous solutions of inorganic substances. Other electrolytes include molten electrolytes, liquid electrolytes and semi-solid electrolytes which are substances wherein one component of their structure, the cationic or anionic, is essentially free for displacement throughout the structure, acting as charge carrier.

Traditionally, commercial batteries employ aqueous alkaline solutions as effective electrolytes. As demonstrated in the Examples section that follows, an exemplary silicon-air battery has been constructed using an aqueous alkaline solution for an electrolyte, and more specifically, an aqueous solution of an alkali hydroxide.

Hence, according to some embodiments of the invention, the electrolyte is an aqueous ionic solution.

In some embodiments, the electrolyte is an aqueous alkaline solution.

According to some embodiments of the invention, the aqueous alkaline solutions can include hydroxides of alkali metals such as lithium, sodium, potassium (KOH), rubidium, caesium and francium.

Water at alkali conditions may corrode silicon and block the anode from the electrolyte, thus reducing the efficiency of the battery. In order to minimize the water content of the alkaline electrolyte, the concentration of the aqueous alkaline solution in the context of an electrolyte in the silicon-air battery should be kept high. According to some embodiments of the invention, the concentration of the aqueous alkaline solution is 8 M or higher, and up to saturation concentration of the alkali metal hydroxide.

As silicon dioxide is formed at the cathode as a by-product of the electrochemical reaction of the silicon-air battery presented herein, cathode suffocation can result from $SiO_2$ accumulation thereon. The present inventor has shown that addition of silicon hydroxide species to the aqueous alkaline electrolyte may reduce this detrimental effect.

Silicon hydroxide, or silicic acid, is a general name for a family of chemical compounds of the element silicon, hydrogen, and oxygen, with the general formula $[SiO_x(OH)_{4-2x}]_n$. Some simple silicic acids have been identified in very dilute aqueous solution, such as metasilicic acid ($H_2SiO_3$), orthosilicic acid ($H_4SiO_4$, $pK_{a1}$=9.84, $pK_{a2}$=13.2 at 25° C.), disilicic acid ($H_2Si_2O_5$), and pyrosilicic acid ($H_6Si_2O_7$), however in the solid state these probably condense to form polymeric silicic acids of complex structure.

According to some embodiments of the invention, the aqueous alkaline solution includes silicic acid.

In some embodiments, the aqueous alkaline solution includes silicic acid at a concentration ranging from 0.001 to 70 percents by weight of the electrolyte solution.

In order to alleviate silicon passivation as a result of alkaline-accelerated corrosion, the present inventor used fluoride anion and/or fluoride-releasing molecules, added to the electrolyte. Non-limiting examples of suitable fluoride anion source molecules which can be used in the context of such embodiments include HF, $NH_4F$ and KF. The present inventor has shown that addition of such molecules in concentrations of from 0.001 to 50 percent by weight of the electrolyte, or from 0.1 to 10 percent by weight of the electrolyte may decrease silicon passivity and enhance its dissolution upon anodic polarization, in addition to the use of high concentrations of KOH.

In some embodiments, in order to enable ambient oxygen to participate in the electrochemical reaction and oxidize silicon, the air cathode includes a layer of a catalyst for trapping oxygen. Exemplary such catalysts include, but are not limited to, palladium, platinum, nickel, cobalt, iron, manganese, ceramic oxides, metal oxides carbon, and any combination thereof.

The air cathode which can serve as a positive electrode for reduction of oxygen, can be any air cathode suitable for a metal-air battery. Teaching of air cathodes can be found, for example, in U.S. Pat. Nos. 3,912,538, 4,407,907, 4,562,124, 4,894,296, 4,927,718, 5,306,579, 5,308,711, 5,342,704, 5,432,022, 5,453,330, 5,665,481, 5,733,676, 6,127,061, 7,588,856 and 7,588,856, all of which are incorporated by reference as if fully set forth herein.

Typically, the air cathode is made of a conductive material and configured to have a large surface area in order to increase its contact with ambient air. In addition, in some embodiments, the air cathode is coated, at least partially, with a layer of a catalyst. As used herein, the term "catalyst" refers to a substance which is capable of accelerating and promoting the dissociation of molecular oxygen.

In some embodiments, an additional layer of highly porous material is also applied over the catalyst layer. Such an additional layer can further facilitate and promote oxygen dissociation at the cathode. The porous layer may comprise a carbonaceous substance or a carbon-less mineral or polymeric substance, such as a fluorinated ethylene propylene polymer and the likes.

In some embodiments, the highly porous layer of the catalytic portion of the air cathode is made up of a mixture of carbon particles, such as carbon fibers or graphite, a particulate material having a high surface area, such as activated carbon, molecular sieves, zeolite, or any other material having a high surface area, metal hydroxide and hydrophobic particles. Graphite, carbon black or carbon fibers act as conductive filler in the catalytic portion or layer for providing a bridge or pathway to allow electrons to transfer from the metal mesh of the cathode through the non-conductive particulate matter having a high surface area.

The high surface area particulate matter, such as the activated carbon, zeolite, molecular sieves, and the like may provide a significant interface contact area for the catalytic reactions. Substantially any metal hydroxide is effective at increasing the electrochemical reaction and consequently the efficiency of an electrochemical cell or battery. Metal hydroxides particularly effective include nickel hydroxide, cobalt hydroxide, iron hydroxide, manganese hydroxide, lanthanum hydroxide, chromium hydroxide and cerium hydroxide. Hence, metal hydroxides are also contemplated in some embodiments of the invention.

The mixture making up the catalytic portion or layer of the air cathode may also include hydrophobic particles, such as polytetrafluoroethylene (PTFE) and other hydrophobic particles mentioned heretofore. These hydrophobic particles may help inhibiting the infusion of water under hydrostatic pressure and capillary attraction to help maintaining the appropriate environment for the electrochemical reactions to take place.

In some embodiments, an adhesive such as epoxy is added. Such an adhesive may help binding the particles of the catalytic portion of the air cathode together.

In addition to the structural and chemical configuration, surface-area, coating and the presence of a catalyst, the air cathode may also comprise a mechanical appendix that can circulate, blow, force or otherwise increase the flow of air or pure oxygen therethrough. Hence, according to some embodiments of the present invention, air, an oxygen-rich gaseous mixture or pure oxygen is being delivered mechanically into the cathode of the battery by a mechanical, electrical or any other air-flow increasing device, such as for example, a pump, a fan, a ventilator a high-pressure container and a tube, which can form a part of the air cathode compartment or be external to the cathode.

The silicon-air batteries according to some embodiments of the present invention may be useful in a form of miniature primary fuel cell for applications such as, for example, microelectromechanical systems (MEMS) and implantable autonomous medical devices which are hard to access, or large multi-cell batteries with replaceable anodes.

Other types of silicon-air batteries for intermediate and small size applications may include those which are manufactured in the form of miniature button cells for hearing aids and alike. The typical silicon-air button cell would generally includes a cathode having at least one air port for the entrance of air and which contains a non-consumable air cathode structure usually comprising a gas permeable hydrophobic polymer film onto which is bonded a metal current collection grid and a waterproofed porous catalyst material, such as metal catalyzed active carbon mixed with a hydrophobic binder. The button cell would also includes an anode container or can which is joined to the cathode typically by crimping and which includes a silicon anode mass, typically in the form of amalgamated silicon powder, or a porous silicon which is compacted and saturated with an electrolyte. The battery would also include an insulator between the cathode and anode, typically made of polyethylene, polypropylene, nylon, and the like, which can function as an electrolyte seal.

The silicon-air batteries according to some embodiments of the present invention may be used as a power source for electric vehicles and the like, because they provide high energy density relative to other cell chemistries. Silicon-air batteries may also be suitable because they may be recharged by mechanically replacing the anode, by replacing the liquid electrolyte which contains silicon particles or by electromechanically replenishing silicon to the anode while also making available a fresh oxygen supply.

Any of the batteries described herein can thus be used in many applications. Generally, the silicon-air battery according to embodiments of the present invention can be incorporated in any electrically driven or hybrid electric (namely, driven by electrical and at least one additional form of energy) system or device, or can be in electrical communication with the system or device for operating it. Systems and devices incorporating the silicon-air battery as described herein can be stationary or movable, portable or non-portable. In some embodiments, the silicon-air battery is incorporated in a power source which is adapted to power an electrically driven system or device, as described herein. The size, shape and output of the silicon-air battery are preferably adapted to the application which consumes its energy.

Herein, the phrase "electrically driven system or device" and "electricity consuming system or device" are used interchangeably.

One type of application which can incorporate the silicon-air battery or portable power source according to some embodiments of the present invention is an electronic device. Representative examples of such a device, include, without limitation, a portable telephone, a personal computer, a notebook computer, a portable charging dock, a pager, a PDA, a digital camera, a gameplayer, a smoke detector, a hearing aid, a portable TV, night vision goggles, a portable GPS device, a portable lighting device, a toy, a computer peripheral device, an household appliance, a cordless household appliance, an industrial product, a mobile equipment, a robot, a cordless tool (e.g., drill, saw).

Another type of application which can incorporate the silicon-air battery or portable power source according to some embodiments of the present invention is an electrically driven or hybrid electric vehicle. One example of a vehicle suitable for the present embodiments is an automobile such as, but not limited to, a car, a bus, a forklift, a segway, a motorcycle, a mobility scooter, a two- three- or four-wheel scooter, a saddle-ride type vehicle. Another example is an unmanned utility vehicle, such as, but not limited to, an autonomous lawn mower, an autonomous pool cleaner and the like. An additional example is an elevated altitude manned or unmanned vehicle, such as, but not limited to, an aircraft, a high altitude aircraft, a rocket and a spacecraft. A further example is a manned or unmanned underwater or above-water vehicle.

The silicon-air battery described herein can also be incorporated in distributed power source such as, but not limited to, a cogeneration system or a stationary power plant for a house, a public structure an industrial facility. Also contemplated are various appliances typical used in emergency situations, including, without limitation, emergency kits, emergency power supplies, emergency lights, backup generators and the like.

The silicon-air battery presented herein can be further used as a component in an autonomous power source in a location, such as, but not limited to, spacecraft, weather station, park, rural location and the like. A silicon-air battery according to some embodiments of the present invention can be compact and lightweight.

The silicon-air battery presented herein can be further used in combined heat and power systems. The silicon-air battery of the present embodiments can be used to generate electric power, and at the same time produce and utilize the by-product "waste" heat.

In some embodiments, the silicon-air batteries described herein are utilized in a method for powering an electrically-driven or electricity-consuming system or device, as described herein. The powering is effected by establishing electrical communication (e.g., connecting) between the silicon-air battery and the electricity-consuming system or device.

It is expected that during the life of a patent maturing from this application many relevant silicon-air batteries will be developed and the scope of the phrase "silicon-air batteries" is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Various embodiments and aspects of the present invention as delineated hereinabove and as claimed in the claims section below find experimental support in the following examples.

EXAMPLES

Reference is now made to the following examples, which together with the above descriptions, illustrate some embodiments of the invention in a non limiting fashion.

Silicon-oxygen couple has a specific energy of 8470 Wh/kg and an energy density of 21,090 Wh/l. From thermodynamic aspects, silicon is outperformed by only the $H_2/O_2$ systems, and is comparable to $Al/O_2$ systems, the latter having a specific energy of 8146 Wh/kg and an energy density of 21,994 Wh/l. Furthermore, silicon is abundant, being the eighth most plentiful element in the universe and the second most plentiful in the earth's crust. Silicon is also non-toxic. Further-still, the electrochemical reaction of silicon produces $SiO_2$ (silica) which can be reduced back readily, can be disposed of safely (as pure sand) or can be recycled for use in a multitude of applications (e.g., building materials, glass industry and the likes).

The following experiments were aimed at investigating the electrochemical behavior of different silicon-based materials as an anodic material in a metal-air electrochemical cell system, which can serve as high density energy source.

The experiments are based on the theory that asserts that new metal air battery based on Si anode would yield 1 electron per 8 equivalent grams of material (4 moles of electrons per 32 grams of Si), which is 400% higher capacity that conventional Zn-air batteries.

Materials and Experimental Methods

Materials:

Silicon single-crystal wafer electrodes including [100] As(arsenic)-doped (0.001-0.005 Ω·cm), [111] As-doped (0.001-0.007 Ω·cm), [111] Sb(antimony)-doped (<0.02 Ω·cm) and [100] medium As-doped (0.1-0.6 Ω·cm) were supplied by University Wafer, USA, and heavily doped p-type wafers, including [100] (0.001-0.005 Ω·cm), [111] (0.005-0.01 Ω·cm) and medium doped [100] (1-3 Ω·cm) were supplied by Si-Mat GmbH, Germany, and were supported with a screwed back contact plate made of gold plated stainless steel.

The air electrode comprised a PTFE powder and activated carbon black (0.45-0.5 gram/cm2 loaded) structure catalyzed by manganese dioxide, supplied by Electric Fuel Inc., pressed onto a nickel 200 mesh (200 openings per inch of a fine nickel screen). Teflon microporous layer was attached to the air side of the electrode.

KOH (Sigma) solution at a concentration of 8-10 M (pH of 14 or higher) was used as an electrolyte.

The exemplary prototypic battery employed for the experiments below is illustrated in FIG. 1.

Silicon-air cells having a diameter of 0.8 cm and a surface area of 0.5 $cm^2$, comprising of a heavily doped n++-type silicon wafer anode and an air cathode were discharged at different current loads with a battery cycler (Maccor 2000).

Methods:

All experiments were conducted under ambient conditions.

Silicon cyclic voltammetry, potentiodynamic and linear polarization studies (performed with EG&G Princeton Applied Research potentiostat/galvanostat 2273) were conducted in an electrochemical cell comprised of Pt quasi-reference and Pt counter electrode, while silicon wafer anode or air cathode served as the working electrode.

Example 1

Silicon-Air Battery Potentiodynamic Measurements

Potentiodynamic measurements were conducted using an exemplary silicon-air battery constructed according to the prototype cell presented in FIG. 1.

The electrolyte used is an alkaline solution, based on potassium hydroxide (KOH), which is a conventional electrolyte in such systems. In order to investigate the Si wafer electrochemical behavior in this environment, results from potentiodynamic experiments were obtained, with different silicon wafers and in different solution concentrations. The results for several of these cases are shown in FIGS. 2A-B.

Figure 2A:
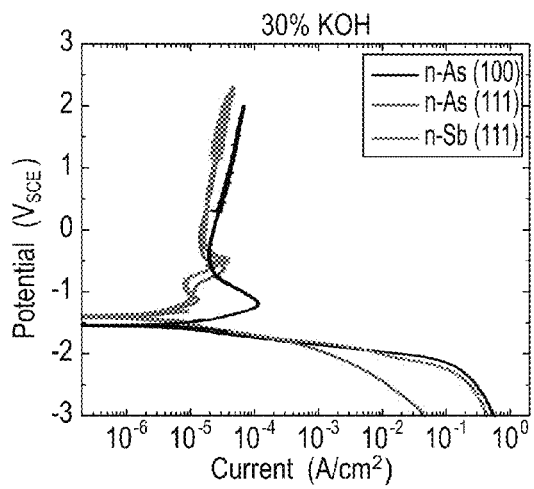
FIGS. 2A-B present comparative potential-current curves obtained for an exemplary silicon-air battery according to some embodiments of the present invention, using n-type wafers (FIG. 2A), and p-type wafers (FIG. 2B), in 30% KOH electrolyte solution, using a scan rate of 5 mV/s, wherein the black curve in FIG. 2A represents the results obtained for a silicon [100] n++-doped with As, the red curve for silicon [111] n++-doped with As and the green line for silicon [111] n++-doped with antimony, and in FIG. 2B the black line represents the results obtained for silicon [100] p-doped with boron but not heavily doped (denoted "no HD"), the red curve for silicon [100] p++-doped with boron and the green curve for silicon [111] p++-doped with boron.
Figure 2B:
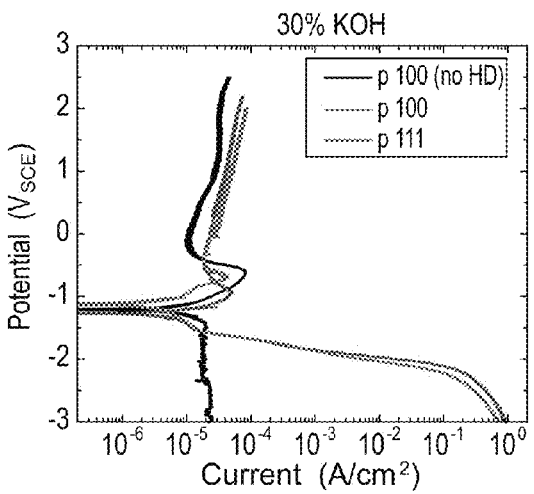

FIGS. 2A-B present comparative potential-current curves obtained for an exemplary silicon-air battery using n-type wafers (FIG. 2A), and p-type wafers (FIG. 2B), in 30% KOH electrolyte solution, using a scan rate of 5 mV/s, wherein the black curve in FIG. 2A represents the results obtained for a Si [100] n++-doped with As, the red curve for Si [111] n++-doped with As and the green line for Si [111] n++-doped with antimony, and in FIG. 2B the black line represents the results obtained for Si [100] p-doped with boron but not heavily doped (denoted "no HD"), the red curve for Si [100] p++-doped with boron and the green curve for Si [111] p++-doped with boron.

As can be seen in FIGS. 2A-B, the anodic region is characterized by an increase in the current as the potential is swept positively from the open-circuit potential (OCP), up to a passivation current peak, then falls to a minimum and shows a passive dissolution on further increase in the applied potential. Moreover, Si [111] orientation presents an appealing characteristic of a reduced dissolution current.

Example 2

Silicon-Air Battery Discharge Curves Measurements

Figure 3:
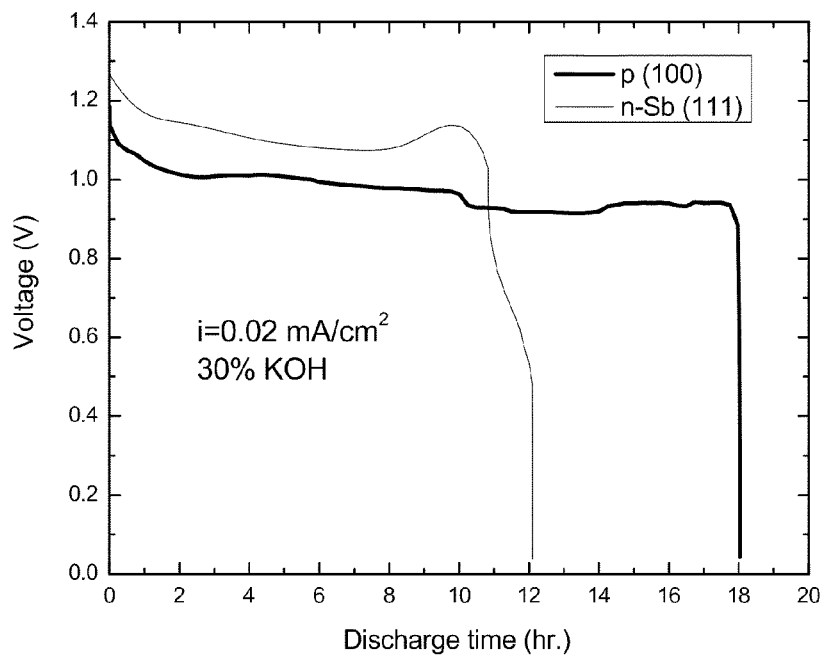
FIG. 3 presents comparative plots of the discharge curves as obtained for an exemplary silicon-air battery according to some embodiments of the present invention, using a silicon [100] p-type wafer (thick line) and a silicon [111] n-type wafer (thin line) in a current density of 10 μA per cm² against an air cathode comprising carbon/catalyst composite materials pressed onto a nickel mesh.

Discharge curves obtained under galvanosotatic controlled studies are shown in FIG. 3.

FIG. 3 presents a comparative plot of the discharge curves as obtained for an exemplary silicon-air battery using a silicon [100] p-type wafer (thick line) and a silicon [111] n-type wafer (thin line) in a current density of 10 μA per $cm^2$ against an air cathode comprising carbon/catalyst composite materials pressed onto a nickel mesh.

As can be seen on FIG. 3, the silicon wafers exhibit typical discharge behavior, with a long period of a potential plateau, ending in a sharp potential drop. The battery could be discharged for a period of 12-18 hours in a current density of 20 μA per $cm^2$, demonstrating the feasibility of a silicon-are battery according to some embodiments of the present invention.

Figure 4:
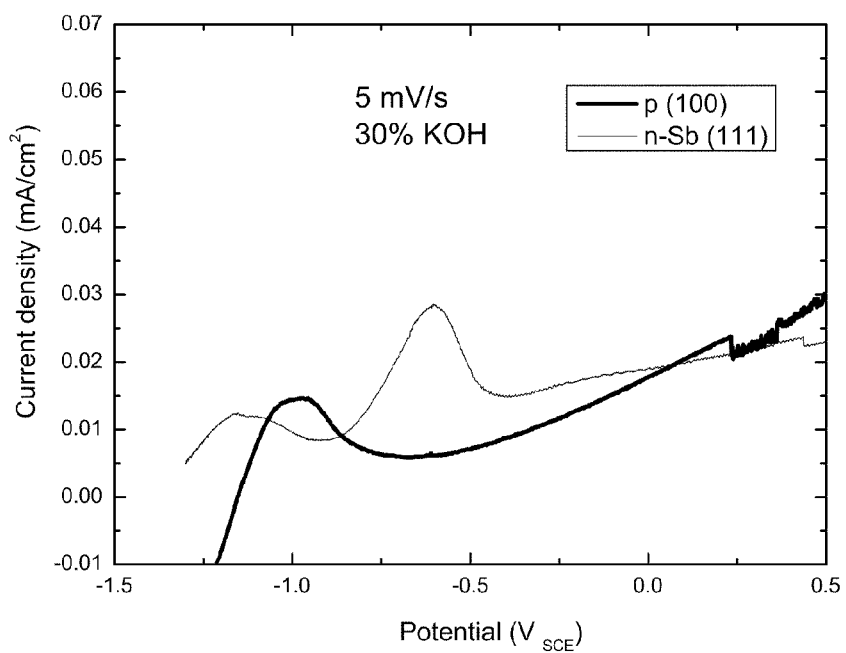
FIG. 4 presents comparative plots of the potential-current curves as obtained for an exemplary silicon-air battery according to some embodiments of the present invention using a silicon [100] p-type wafer (thick line) and a silicon [111] n-type wafer (thin line)

The matching potentiodynamic measurements for the two wafers are shown in FIG. 4.

FIG. 4 presents a comparative plot of the potential-current curves as obtained for an exemplary silicon-air battery using a silicon [100] p-type wafer (thick line) and a silicon [111] n-type wafer (thin line).

As can be seen on FIG. 4, the oxidation of silicon in an aqueous alkaline solution depends on the crystal structure, as both heavily doped n- and p-type silicon possess different oxidation potentials (−1 V for p-type and −0.75 for n-type. Thus, the working potential of batteries utilizing such different silicon fuel anodes is also expected to exhibit a different profile.

Example 3

Silicon/Iron-Air Battery System

A Fe-air battery system is known in the art, but a Si/Fe-air battery system is being studies and presented herein for the first time The natural Fe/Si alloyed powder contains 25% silicon with an average particle size of about 20 μm.

To serve as an anode and fuel, the active Si/Fe powder was mixed with 30 wt % KOH solution (1:1) and with 0.5 wt % of the gelling agent Carbopol polymer (CAS Number 9063-87-0).

Figure 5:
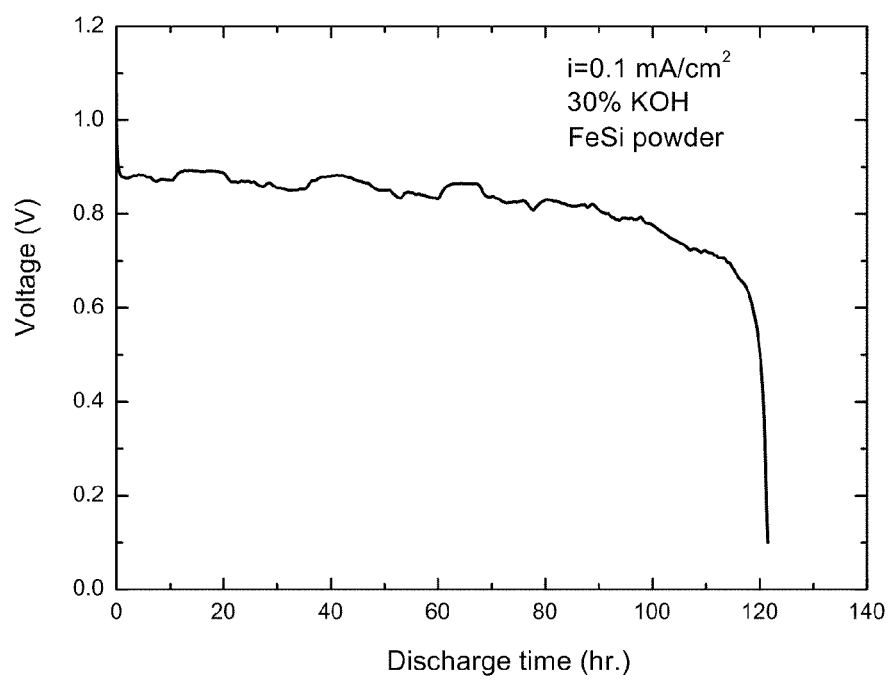
FIG. 5 presents a potential-time curve for Si/Fe powder combined with the oxygen (air) cathode, in 30% KOH solution, according to some embodiments of the present invention, wherein the cell was discharged in a current density of 0.1 mA per cm², presenting a long discharge profile of above 120 hours.

Typical discharge curve for Si/Fe-air battery system is shown in FIG. 5.

FIG. 5 presents potential-time curves for Si/Fe powder combined with the oxygen (air) cathode, in 30% KOH solution, wherein the cell was discharged in a current density of 0.1 mA per $cm^2$, presenting a long discharge profile of above 120 hours.

As can be seen in FIG. 5, although current density discharge is sufficient, power calculations yielded low capacity values.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A battery comprising an anode, a cathode, an electrolyte and an electric conduit that allows electric current flow between said cathode and said anode, said anode comprising silicon as fuel, and said cathode comprising oxygen as an oxidant, wherein said silicon is in a form of a single crystal wafer.

2. The battery of claim 1, wherein said oxygen is derived from ambient air.

3. The battery of claim 1, wherein an orientation of said crystal is selected from the group consisting of silicon [100] crystal orientation, silicon [111] crystal orientation and silicon [101] crystal orientation.

4. The battery of claim 1, wherein said silicon comprises a dopant at a concentration of up to $10^{18}$ dopant atoms in 1 cm$^{-3}$ of said silicon.

5. The battery of claim 4, wherein said dopant is selected from the group consisting of antimony, phosphorus, arsenic, boron, aluminium and gallium.

6. The battery of claim 4, wherein said dopant is selected from the group consisting of a p-type dopant and an n-type dopant.

7. The battery of claim 4, wherein said silicon is doped degenerately.

8. The battery of claim 1, wherein said electrolyte comprises an aqueous alkaline solution.

9. The battery of claim 8, wherein said aqueous alkaline solution further comprises silicic acid at a concentration that ranges from 0.001 percent to 70 percents by weight of said solution.

10. The battery of claim 8, wherein said aqueous alkaline solution further comprises a fluoride.

11. The battery of claim 10, wherein a concentration of said fluoride ranges from 0.001 percent to 50 percents by weight of said solution.

12. The battery of claim 10, wherein said fluoride is selected from the group consisting of HF, NH$_4$F and KF.

13. The battery of claim 1, wherein at least one of said anode and said cathode comprises a catalyst layer.

14. The battery of claim 1, wherein said cathode comprises a catalyst layer.

15. The battery of claim 14, wherein said catalyst is selected from the group consisting of palladium, platinum, nickel, cobalt, iron, manganese, an oxide thereof, a carbonaceous material, and any combination thereof.

16. The battery of claim 1, wherein said cathode is an air cathode.

17. The battery of claim 16, wherein said cathode is having a configuration selected from the group consisting of a plate, a fibrous, a mesh, a rod, a tubular body, a sintered body and a foamed body.

18. The battery of claim 14, wherein said catalyst accelerates dissociation of molecular oxygen.

19. The battery of claim 14, wherein said cathode further comprises a carbonaceous material.

20. The battery of claim 1, further comprising a device for increasing flow of said oxygen.

21. The battery of claim 20, wherein said device is selected from the group consisting of a pump, a fan, a ventilator, a high-pressure container and a tube.

* * * * *